(12) United States Patent
Biester et al.

(10) Patent No.: US 8,175,744 B2
(45) Date of Patent: May 8, 2012

(54) INDUSTRIAL FURNACES AND DEVICE FOR PERFORMING THE METHOD AND COMPUTER PROGRAM

(75) Inventors: Frank Biester, Kleve (DE); Thomas Eversmann, Dorsten (DE); Werner Schulte, Hünxe (DE); Jörg Willeke, Hilden (DE); Regina Wolff, Kalkar (DE)

(73) Assignee: Ipsen, Inc., Cherry Valley, IL (US)

( * ) Notice: Subject to any disclaimer, the term of this patent is extended or adjusted under 35 U.S.C. 154(b) by 41 days.

(21) Appl. No.: 12/682,512

(22) PCT Filed: Sep. 3, 2008

(86) PCT No.: PCT/DE2008/001454
§ 371 (c)(1),
(2), (4) Date: Jul. 30, 2010

(87) PCT Pub. No.: WO2009/046691
PCT Pub. Date: Apr. 16, 2009

(65) Prior Publication Data
US 2010/0292823 A1 Nov. 18, 2010

(30) Foreign Application Priority Data
Oct. 10, 2007 (DE) ..................... 20 2007 014 120 U

(51) Int. Cl.
*G06F 19/00* (2011.01)
*C21B 7/24* (2006.01)

(52) U.S. Cl. .......... 700/209; 700/97; 700/145; 702/130; 266/80; 432/51

(58) Field of Classification Search .................... 700/97, 700/145, 209; 702/130; 266/80; 432/51
See application file for complete search history.

(56) References Cited

U.S. PATENT DOCUMENTS
5,187,670 A 2/1993 Keil
(Continued)

FOREIGN PATENT DOCUMENTS
DE 26 30 818 1/1977
(Continued)

OTHER PUBLICATIONS

Frank Theisen: "Leitrechnersoftware fur vollautomatische Chargenofenlinien", Gaswarme International, May 2007, pp. 363-365, XP002509660, Essen, Germany.
(Continued)

*Primary Examiner* — Sean Shechtman
(74) *Attorney, Agent, or Firm* — Dann, Dorfman, Herrell and Skillman, P.C.

(57) ABSTRACT

In order to plan the performance of heat treatment of metal workpieces before the beginning of the heat treatment in the particular industrial furnace and perform it autonomously thereafter, the invention proposes a method and computer program and an apparatus having a computer (1) for the automatic preparation of technological formulas for the heat treatment, firstly loading parameters of a selected material of the metal workpiece and a formula structure template of a selected treatment method from a material databank (10) and providing data from a user interface and compiling a formula structure, then establishing the parameters of the metal workpiece, the compiled formula structure, and the data from the user interface as values of formula segments, from which the technological formula for heat treatment is finally generated, this technological formula being able to be readjusted, stored in a program databank (12), and retrieved for the heat treatment of metal workpieces in industrial furnaces (5)(FIG. 1).

21 Claims, 5 Drawing Sheets

U.S. PATENT DOCUMENTS

| | | | |
|---|---|---|---|
| 6,591,215 B1 | 7/2003 | Blumenthal | |
| 6,944,580 B1* | 9/2005 | Blume et al. | 703/1 |
| 2002/0146657 A1 | 10/2002 | Anderson | |

FOREIGN PATENT DOCUMENTS

| | | |
|---|---|---|
| DE | 20 2006 018 879 | 2/2007 |

OTHER PUBLICATIONS

Ranjeet Vader: "Development of Computer Aided Heat Treatment Planning System", Jun. 2002, Worcester Polytechnic Institute, Worcester, USA, XP002509663, paragraphs [02.2], [02.3], [02.4]; Figures 2.20, 2.21, 2.22; paragraphs [03.1]-[03.4]; Figures 3.1-3.17; table 3.1; paragraphs [04.4], [04.5]; Figures 3.20-3.39.

Hill K. Nandi, Mark Thomason, Mickey Delhunty: Software Tool Optimizes Furnace Design and Operation:, Heat Treating Progress, Nov. 2002, XP002509661, Ohio, USA.

Invensys: "3500 Series User Guide" Eurotherm, Nov. 2005, pp. 69-78, XP002509662.

International Search Report dated Jan. 30, 2009 of International Application No. PCT/DE2008/001454.

* cited by examiner

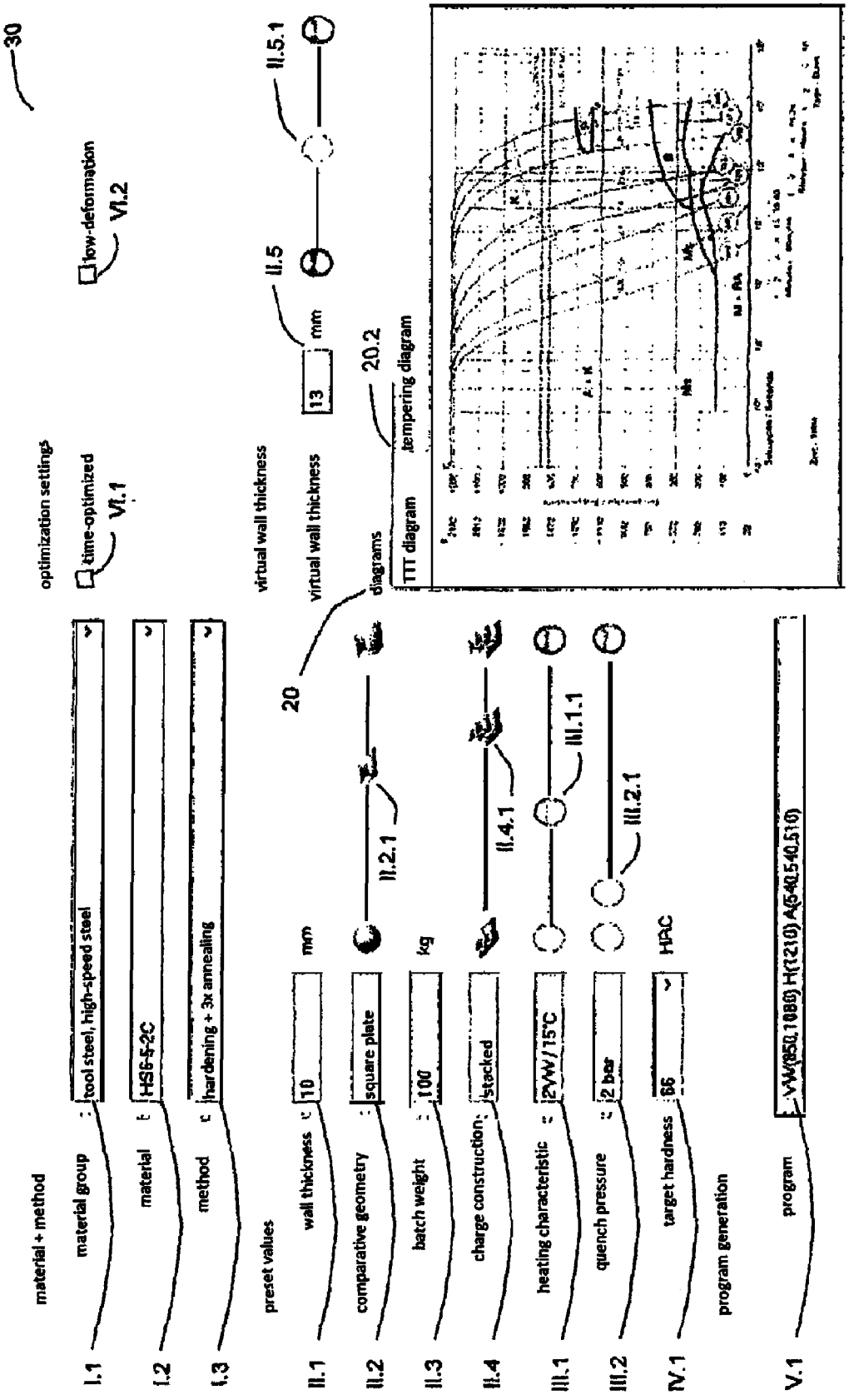

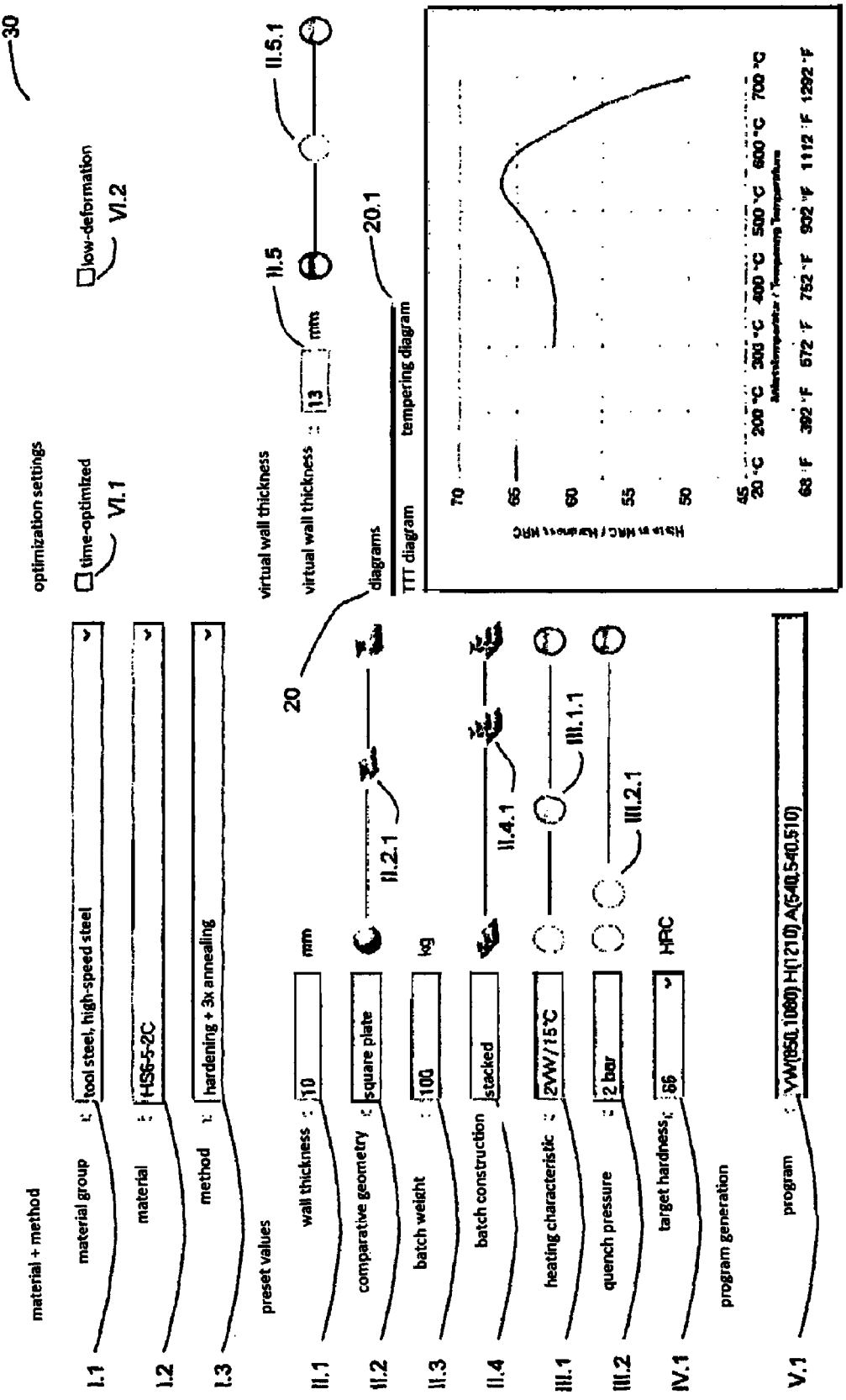

INDUSTRIAL FURNACES AND DEVICE FOR PERFORMING THE METHOD AND COMPUTER PROGRAM

TECHNICAL AREA

The invention relates to a method and computer program for automatically preparing technological formulas for a heat treatment of metal workpieces in industrial furnaces. The formulas are prepared, after the specification and setting of the required parameters by the operator, by the computer program and can be repeated arbitrarily and stored and displayed as well as retrieved for autonomous performance of the heat treatment in the industrial furnace. Furthermore, the invention relates to an apparatus for automated performance of the method and computer program for the particular programmed heat treatment in the autonomous sequence of the industrial furnace.

PRIOR ART

The technical area designated at the beginning has already been studied multiple times in regard to its optimal technological preparation of the heat treatment to be performed later of the workpiece or the batch in an industrial furnace.

Accordingly, methods and devices for the heat treatment of metal workpieces in industrial furnaces are known, which rationalize the sequences, but the field of technological preparation offers still further potentials, of exploiting the developed state of the heat treatment method and furnace technology more efficiently and increasing the availability of an industrial furnace in this regard.

To determine the extent of the heat treatment of the material, it is taught according to DT 26 30 818 A1 that, according to the method, a signal representative for the heat treatment temperature is integrated over time using a formula of the heat treatment units, the times, a constant, the temperature, and the relative speed of the softening/hardening. The number of the heat treatment units is summed during the method performance, in order to determine the extent of the heat treatment. The signal may be integrated continuously and samples of the signal may be integrated after selected intervals. The setting of the number of the heat treatment units can be performed according to the lowest temperature. The fuel supply control is made possible after equalizing of various temperatures.

The associated device essentially comprises an apparatus for the integration of the signal and an apparatus for the summation of the number of the heat treatment units for performing the above method steps.

It is initially disadvantageous for this purpose that the plurality of the variants of the heat treatments, such as the tempering of metals, cannot be acquired complexly enough using the values to be integrated. Furthermore, target values must often be corrected during the beginning or during the performance of the heat treatment.

A further known device for the heat treatment of metal workpieces according to DE 20 2006 018 879 U1 has a control apparatus having measuring apparatus, which acquires target parameters for the treatment atmosphere and actual values for signal output and makes the heat treatment able to be terminated using a control unit in the event of inequality of target and actual values.

This device can control only a limited sequence of the method performance according to the object.

In addition, EP 0 556 176 B2/DE 91 04 377 T3 has already disclosed a special control system for planning the workpiece treatment in a heat treatment method. The heat treatment of parts is performed using a plurality of connected chambers, two of which are rotating chambers for carburization or carbonization. A plurality of part positions is subject to reactive or reaction-ready hydrocarbon gases at elevated temperatures. The parts are discharged into the rotating chambers or ejected independently of their function. The processing chambers process at least two parts simultaneously using unique processing times.

This control system has storage means for recording, for each part, specific processing times, target processing paths with sequence of the processing chambers, number and location of occupied part positions in each chamber, and diverse formula and/or instructional specifications and their calculations, time window recordings, status means for updating, a databank, and hardness depth values. The entry into the preheating chamber, slow cooling chamber, press and batch quenching chambers, and rotary tempering chamber are controlled. The method teaches the time planning and/or assignment of parts into the continuous furnace structure having the steps for storing/recording the functions of the control system.

Notwithstanding the application of the control system for the heat treatment of parts in a continuous furnace structure having a plurality of connected chambers, this control system and the method teaches neither the possibility of an autonomous sequence of the heat treatment nor a technological preparation of heat treatments in industrial furnaces according to the species. At that the control system can only be applied for the continuous furnace structures.

All known methods and devices similar to the species share the feature that the individual method parameters to be specified are largely a function of the heat-technology know-how of the technician or operator. The required heat-technology specific treatment of the workpiece having the properties to be achieved is therefore not always reached.

For the proper performance of a specific heat treatment method for the heat treatment of metal workpieces, it is necessary on the operator side to specify corresponding method parameters for the method performance. Method parameters of this type may be temperature, pressure, processing time, and/or the like, for example. These method parameters to be specified on the operator side determine the method result, because of which it is decisively important, to achieve a desired method result to be reached, for the corresponding method parameters to be specified as precisely as possible and according to objective criteria.

Although experiential values may certainly be used suitably for the specification of method parameters for the performance of a specific heat treatment method, this is not free of disadvantages.

Thus, in particular operator-side incorrect estimations frequently occur and, resulting therefrom, incorrect inputs with respect to the method parameters, which can have the result that workpieces are incorrectly treated and the discard rate rises unnecessarily.

In particular for the operators of industrial furnaces, the need exists to be able to specify method parameters for the performance of a heat treatment method for the heat treatment of metal workpieces reliably, so that thereafter the heat treatment of the workpieces in the industrial furnace can run extensively free of incorrect inputs and autonomously.

SUMMARY OF THE INVENTION

The object of the invention is to provide a method and computer program for the automatic preparation of technological formulas for the heat treatment of metal workpieces in industrial furnaces and to allow conditions through a program-controlled determination, so that the performance of heat treatments of metal workpieces in industrial furnaces can be planned before the beginning of the heat treatment in the particular industrial furnace and can be performed running autonomously thereafter using an apparatus.

The direction, which material, and how it is to be treated are already to be programmed and specified deliberately so that the heat treatment can run in the furnace autonomously according to the objectively qualified technological specifications of the heat treatment process.

The formula programmed and generated according to the invention for the treatment in the furnace charged with the workpiece batch can then be activated, whereby the autonomous heat treatment sequence according to the program is finally secured. All method parameters are thus to be maintained from the beginning to the termination of the heat treatment in the industrial furnace extensively independently of subjectively qualified influences or knowledge (know-how) of the technician or operator.

The object is achieved according to the method and computer program using
values for a material of a particular workpiece, details of heat treatment methods, and of technical details of the particular industrial furnace,
a step-by-step specification or generation of parameters which can be precalculated for the heat treatment of the workpiece, and
a computer, which generates a heat treatment program, having databanks and a programmed storage of a generated heat treatment program and its retrieval for activation of the heat treatment in the industrial furnace
according to the invention in that
a) in a first program step, a material group and the material are selected and a heat treatment method is determined as a function of the selected material,
b) in a second program step, data of the workpiece/the batch such as
  a wall thickness is input,
  a comparative geometry is selected,
  a batch weight is input, and
  a batch structure is selected
  and a virtual wall thickness is calculated automatically therefrom,
c) in a third program step, a heating and quenching characteristic, which is a function of the material and is optionally manually changeable, is integrated together with the data of the batch and the available parameters of the industrial furnace, and
d) in a fourth program step, firstly
  data of the selected material on treatment parameters and data of the selected heat treatment method are loaded into a formula structure template and
  are compiled into a formula structure from the formula structure template employing the data from a user interface, such as
    heating characteristic and
    quenching characteristic
    and, if necessary,
    a target hardness,
    from which
      values of formula segments, such as
        segment durations,
        temperatures,
        ramp slopes and/or temperature ramps, and
        pressures are established and then, in the result of the fourth program step, a technological heat treatment formula is automatically generated, which can be reworked, stored in a programmed databank (12), and retrieved at the industrial furnace for the heat treatment of metal workpieces.

After the third program step, in a first work step the desired target hardness can be selected and input as a directional value of a work hardness from a value range according to achievable work hardnesses as a function of the material.

After at least the third program step, in a second work step, an optimization setting can be established and set for a time-optimized or low-deformation treatment of the workpiece/the batch.

In a third work step, manual reworking and storage of the generated heat treatment formula in the programmed databank can be performed.

The method and program is capable of expansion in a fifth program step, in that the heat treatment formula is transmitted to the furnace. For this purpose, for the heat treatment of the workpiece/the batch running autonomously in the industrial furnace, the heat treatment program is retrieved from the programmed databank and mediated for the heat treatment in the industrial furnace.

The treatment method is already determined in the first program step from data of the material group and the material according to a first file, second file, and third file of a material databank.

The calculation of the virtual wall thickness in the second program step is performed according to an algorithm as the function=$f_V$* according to the equation $f_V = f_{CG} * f_{CA} * f_{G1}$.

A rulebook is used in the program, which comprises a fourth file for the comparative geometry, a fifth file for the batch layout, a sixth file for the heating characteristic, and a seventh file for the quenching characteristic.

The fourth file in the rulebook comprises the data for the details of comparative geometries, such as sphere, cylindrical disc, hollow-cylindrical ring, cylindrical shaft, square plate, square rod, square cube.

The fifth file in the rulebook comprises the batch layout such as single-layer recumbent, single-layer upright, multi-layer recumbent, multilayer upright, stacked In the third program step, the heating characteristic is input according to the sixth file in the rulebook in the dimension of the number of preheating steps in slopes of ° C./min as the gradient and the quenching characteristic is input according to the seventh file in bar.

It is advantageous for the user that a time-temperature transformation (TTT) diagram, which is stored in the computer, and a stored tempering diagram are displayed already after the first program step.

Furthermore, it is advantageous that the desired work hardness is input according to an eighth file from the material databank.

The complex heat-technological formula, which is running in the industrial furnace and is generated and stored from parameters of a heat treatment of a specified technology, can be measured using a measuring unit having actual values, compared via a comparison circuit to the parameters of the specified technology, and readjusted without problems using a control unit in the event of inequality.

The apparatus for performing the method comprises a computer having databanks and a programmed storage of a particular generated heat treatment program and its retrieval for the activation of the heat treatment in an industrial furnace, a user interface being associated with the computer according to the invention, which has fields for displaying
material group, material, and method,
wall thickness, comparative geometry, batch weight, batch layout, virtual wall thickness,
heating characteristic, quenching characteristic,
work hardness/target hardness,
time-optimized and low-deformation, and
program name.

Furthermore, the user interface has a first virtual slide control for the comparative geometry, which can be selected and changed by the operator, a second virtual slide control for the batch layout, which can be selected and changed by the operator, a third virtual slide control for the virtual wall thickness, which can be selected and changed by the operator, a fourth virtual slide control for the heating characteristic, which can be selected and changed by the operator, and a fifth virtual slide control for the quenching characteristic, which can be selected and changed by the operator.

Using these elements, the user interface is designed as a decisive technical means, which creatively supports the solution of the stated object.

Finally, the apparatus can be expediently implemented if a measuring unit for actual values measured in the industrial furnace, a comparison circuit for the comparison to parameters of the specified technology according to the generated heat treatment program, and a regulating unit for a readjustment in the event of inequality of parameters are provided.

The heat treatment of the workpiece/the batch running autonomously in the industrial furnace can be retrieved from the program databank via a button on the user interface after storage of the complex generated formula and mediated for heat treatment in the industrial furnace.

The particular generated heat treatment program can be shown in the user interface in symbolic sliders, processed manually therein, and stored via a further button.

It is advantageously provided according to the method that the actual method parameters of a heat treatment method may be measured as actual values.

It is accordingly possible to compare the method parameters measured as actual values to the method parameters specified as target values and to perform a readjustment of the method parameters in the event of inequality between measured actual values and specified target values.

In general, the method teaches that as a function of a first selected value, a list is determined, produced, or generated for the selection of a second selected value, and specified values are specified as a function of workpieces to be heat treated and/or as a function of a batch formed by a plurality of workpieces to be heat treated.

It is typical that firstly selected and/or specified values are selected or specified by the operator, but then the method parameters can be generated automatically by a corresponding computing unit executing a function as a function of these values. The method parameters thus determined are designated as pre-calculable parameters here, which can only be manipulated by the operator within objectively required limits.

Typically, i.e., if no operator-side manipulation occurs, the parameters thus precalculated are accepted as target values to be maintained in the method and thus for the technological formula. The heat treatment can then be performed according to the generated technological formula, in an autonomous sequence in the industrial furnace.

A manipulation of the parameters which are initially only determined by calculation is sometimes also required by the operator. Being able to perform changes on the parameters determined by calculation is therefore not precluded by the method according to the invention. This relates to optimization settings to be executed by the operator, if treatment is to be performed time-optimized or with low deformation, for example.

As a function of these optimization settings, which are only possible within specific limits determined by the system on the basis of the previously input selected and/or specified values, additional optimization of the method parameters for performing the generated heat treatment method can be achieved.

If needed, a plurality of both selected and/or specified values and also of optimization settings can be performed, in order to achieve the required heat treatment result.

To perform the method and computer program, the apparatus according to the invention can also be compiled from the complexes such as
a computer which generates the heat treatment program,
above-mentioned stored files from the material databank and the rulebook,
the programmed storage of the generated heat treatment program, and
the retrieval for activation of the heat treatment program in the industrial furnace.

The invention advantageously allows method parameters for the performance of a specific heat treatment method to be determined and fixed automatically. Determination and establishment of method parameters which is independent of operator-side experiential values are thus achieved for the performance of a heat treatment method for the heat treatment of metal workpieces.

Using the invention, it is thus possible to be able to specify a method parameter for the performance of the heat treatment method for the heat treatment of metal workpieces reliably and reproducibly. Desired treatment results may thus be achieved independently of the operator, i.e., independently of operator-side or subjective experiential and method values.

The invention has available fixed selected values from lists having predetermined data. This includes, inter alia, the material of the workpieces to be treated. Thus, for example, a list is provided for the selection of the material, in which the associated material groups are listed, such as high speed steel, cold worked steel, hot worked steel, and non-rusting steel, which is to be selected from by the operator to establish a first selected value For a further selected value, the selection of the desired treatment method is provided. A list is also stored in this regard having possible treatment methods, such as hardening, hardening and tempering, hardening and warm bath, hardening and warm bath and tempering, tempering, soft annealing, solution annealing, strain annealing, and/or the like, from which a desired treatment method to be performed is to be selected by the operator.

In certain circumstances, the preceding selection of a material fundamentally precludes a treatment method which is available for selection beforehand, because of which, according to significant features of the invention, values are generated, using which the further selected values can be generated as a function of a first selected value. Operator-side input errors or the input of incorrect experiential values may thus be fundamentally minimized or even avoided beforehand.

The selected values to be selected by the operator from the material databank are thus used for generating method parameters for performing a specific heat treatment method in the scope of the described technological formula.

In addition to the selected values, specified values are also used to establish these method parameters, these being understood in the meaning of the invention as those values which are to be specified as a function of workpieces to be heat treated and/or as a function of a batch formed by a plurality of workpieces to be heat treated.

These include the wall thickness of the workpieces to be treated, the comparative geometry, the workpiece or batch weight, and the batch layout. "Wall thickness of the workpiece to be treated" is to be understood as the thickness of the material of the workpiece to be treated or the workpiece part to be treated.

For example, the sphere, the cylindrical disk, the hollow-cylindrical ring, the cylindrical shaft, the square plate, the square rod, or the square cube may be specified as the comparative geometry.

On the basis of these specified values, which may also be designated as batch data, in consideration of the selected values of the rulebook previously selected by the operator, method parameters may be automatically determined for performing the determined heat treatment method. Method parameters of the rulebook in this meaning are the heating characteristic as well as the quench pressure and the target values and optimization settings.

The heating characteristic describes the intensity and form of the heating procedure for the hardening process. It specifies the number of the preheating steps from 0 to 4, for example, as well as the slope of the temperature target value, both between the individual preheating steps and also between the last preheating steps and the temperature target values to be reached. The slopes are, for example, in the range from 5° C. per minute up to 30° C. per minute, a temperature jump also optionally being able to be specified Depending on the quenching gas used, the quench pressure is in the range from 2 bar to 12 bar, for example.

The method parameters which can be determined using the invention, such as heating characteristic and quench pressure, are used as initially calculated method parameters, which may be manipulated, i.e., readjusted by the operator within certain limits, i.e., upper and lower limits.

For this purpose, it is also provided that the "virtual", i.e., an imaginable possible or apparent wall thickness is output, calculated and generated as an intermediate value, on the basis of the previously explained batch data.

This intermediate value can only be manipulated, i.e., readjusted, in specified limits by the operator. As a function of such a readjustment, method parameters result which can be determined automatically using the apparatus according to the invention and computing units. The apparatus according to the invention thus provides the possibility of being able to manipulate, i.e., readjust the automatically determined method parameters, but not according to arbitrary values.

Because of the possibility given by the invention of the operator being able to readjust method parameters within certain limits, the method parameters determined according to the acquired selected and/or template values are designated as calculated method parameters.

In an embodiment of the invention, the actual method parameters specified as target values for a desired performance of a heat treatment method are measured, compared, and optionally corrected during performance of the heat treatment.

The calculated method parameters typically determine the formula. As previously described, readjustment of the calculated method parameters is also provided, so that the readjusted method parameters ensure the target values to be maintained during the method performance.

Finally, the invention also comprises the operator-side possibility of performing the heat treatment generated as a formula in a time-optimized manner or optimized for low deformation in regard to the workpieces to be treated and without incorrect data. Notwithstanding this, obligatory specifications for the desired target hardness may also be set beforehand.

All settings to be performed by the operator, such as optimization settings, are used for the purpose of preparing the previously determined method parameters as optimized with respect to the heat treatment result to be achieved for the later autonomously running heat treatment.

The regulatory apparatus having measuring apparatus used during a performance of a heat treatment method can be used for the purpose of comparing the real actual values after measurement and the precalculated technological formula using a comparison circuit, in order to be able to perform a readjustment of the actual values if needed in the event of an established deviation between actual values on one side and target values on the other side, during the actual heat treatment method.

A permanent, i.e., continuous readjustment of the method parameters which decisively influence the method result is advantageously possible in this manner, if this proves to be necessary.

It is within the scope of typical measures of one skilled in the art to equip the measuring apparatus with corresponding sensors, such as temperature and/or pressure sensors, for determining the actual values.

In its entirety, the invention allows the method parameters which are necessarily to be preset to achieve a specific heat treatment result to be executed automatically according to the method and computer program using the apparatus according to the invention. The selected and/or specified values to be detailed are always those which can be objectively acquired free of any subjective or operator-side experiential values.

As a result, using the invention, the prepared formula for heat treatment of metal workpieces may advantageously be prepared and conditioned using program technology so that autonomous execution of the heat treatment method is possible thereafter.

Because the method parameters for performing a heat treatment method can be determined and established automatically, the advantage results overall that incorrect inputs by the operator with respect to the method parameters to be specified are fundamentally prevented. Incorrect treatment of workpieces may be practically prevented.

BEST EMBODIMENT OF THE INVENTION

Figure 1:
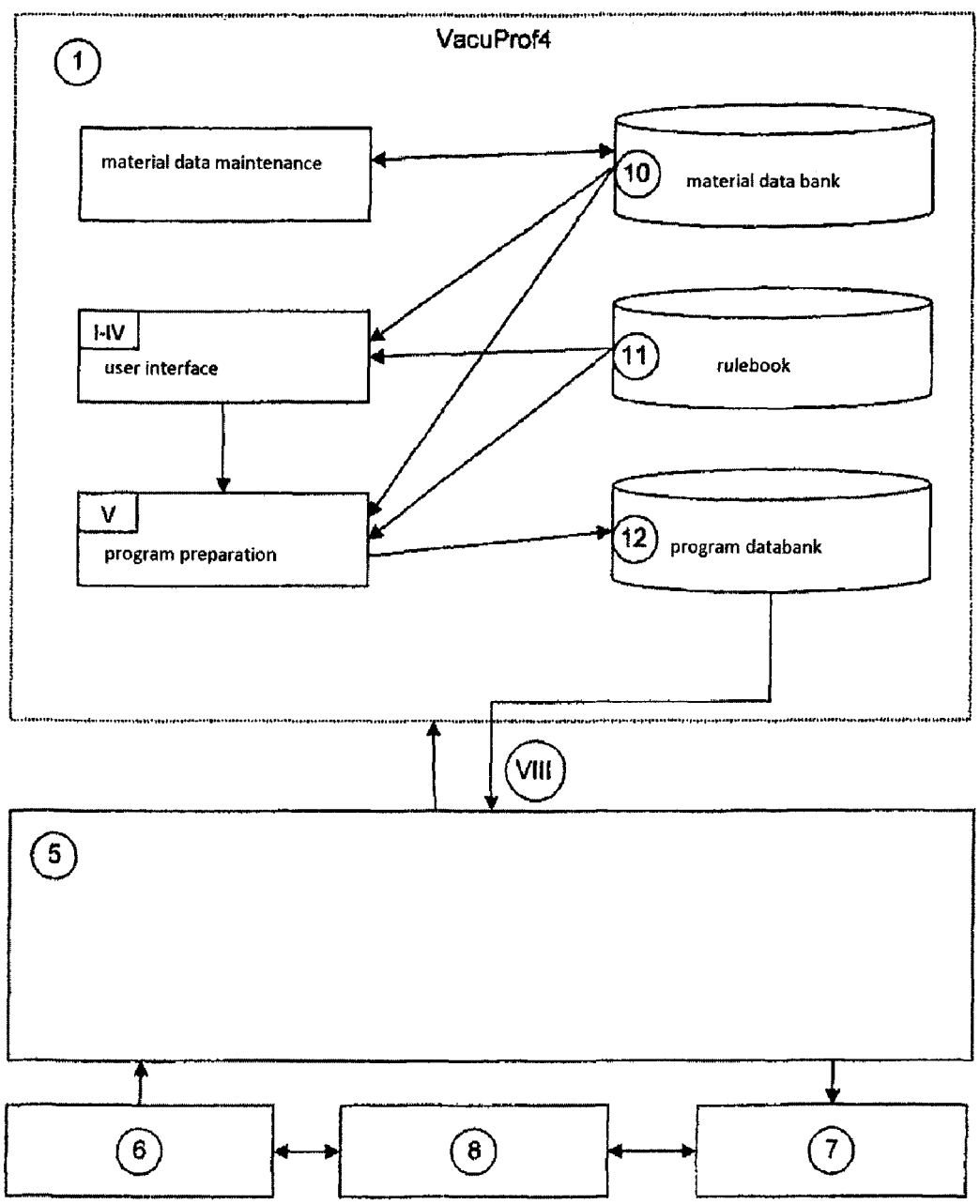
FIG. 1 shows a schematic illustration of the program and the apparatus according to the invention, FIG. 2a) shows a flowchart of the structure according to the invention of the program steps in the user interface, FIG. 2b) shows a flowchart of the elements of the program preparation, FIG. 3a) shows a user interface associated with the computer for program operation having the symbolically displayed diagram of a TTT diagram (time-temperature transformation), and FIG. 3b) as FIG. 3a), but with the symbolically displayed diagram of a tempering diagram.

The invention is initially described using the schematic figure according to FIG. 1.

In a computer 1
a material databank 10 having a first file for material groups, second file for materials, third file for methods, and eighth file for work hardnesses, and
a rulebook 11 having a fourth file for comparative geometries, fifth file for batch layouts, sixth file for heating characteristics, and seventh file for quenching characteristics are stored.

The material databank 10 and the rulebook 11 comprise the parameters which can be determined and precalculated for a heat treatment program. A user-friendly and objective selection and/or display of the parameters acquired within limits is made possible.

The blocks "material data maintenance" and "user interface I-IV" indicate the functional relationships of the program to the material databank 10 and the rulebook 11 and a program databank 12. The heat-technology formula prepared according to the invention is stored in the program databank 12, it is transmittable to an industrial furnace 5 for heat treatment of the workpieces. A measuring unit 7 and a regulating unit 6 having interconnected comparative circuit 8 are associated with the industrial furnace 5.

Figures 2A, 2B:
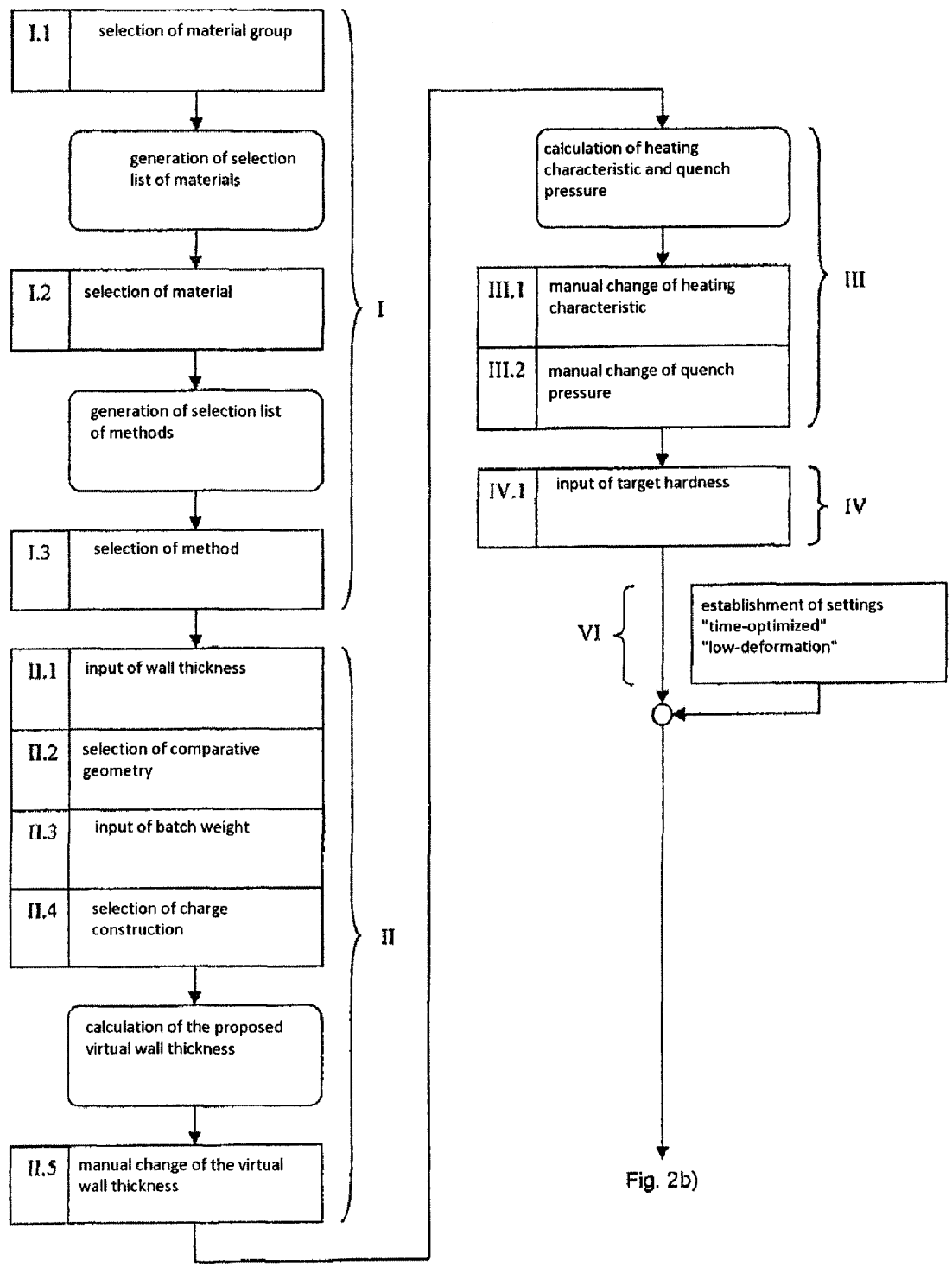
Figure 2B:
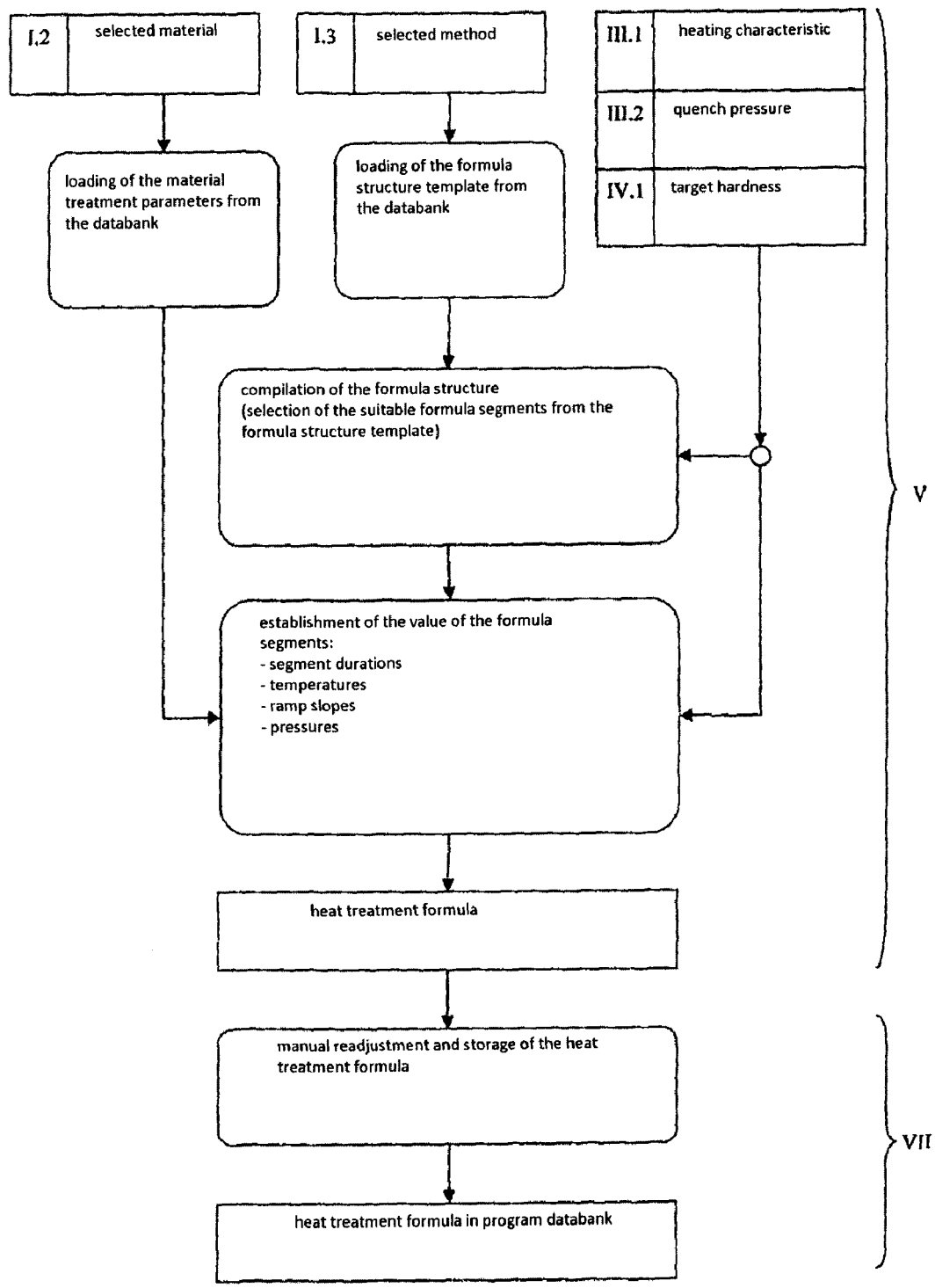

The flowcharts according to FIG. 2*a*) and FIG. 2*b*) show the program sequence according to the invention in simple platform, according to the method, in the program
1. in a first program step I, a material group and the material are selected and a heat treatment method is determined as a function of the selected material,
2. in a second program step II, data of the workpiece batch such as
   a wall thickness is input,
   a comparative geometry is selected,
   a batch weight is input, and
   a batch layout is selected
   and a virtual wall thickness is automatically calculated therefrom,
3. in a third program step III, heating and quenching characteristics, which are a function of the material and are optionally manually changeable, are integrated from the virtual wall thickness together with the data of the batch and the available parameters of the industrial furnace 5, and
4. in a fourth program step V, firstly
   data of the selected material on treatment parameters and data of the selected heat treatment method are loaded into a formula structure template and
   are compiled into a formula structure from the formula structure template using the data from a user interface, such as
   heating characteristic and
   quenching characteristic
   and, if necessary,
   a target hardness,
   from which
   values of formula segments, such as
   segment durations,
   temperatures,
   ramp slopes and/or temperature ramps and
   pressures
   are established and then, as a result of the fourth program step V, a technological heat treatment formula is automatically generated, which can be readjusted, stored in the program databank 12, and retrieved for the heat treatment of metal workpieces for the industrial furnace 5.

In the meaning of one skilled in the art of the invention, the selected terms, inter alia, are to be defined as follows from above-mentioned values of formula segments:
"segment durations" as times for the heat treatment of the workpiece in the particular treatment section,
"temperature ramps" as a linear temperature curve from an initial temperature value at the beginning of the segment up to a target temperature value at the end of this segment, and
"ramp slopes" as a slope of the temperature ramp, the slope being able to be both positive and also negative and being input in the unit [degrees Celsius per minute].

After the third program step III, according to FIG. 2*a*), in a first work step IV, the desired target hardness is selected and input as a directional value of a work hardness from a value range according to achievable work hardnesses as a function of the material.

According to at least the third program step III, a time-optimized or low-deformation treatment of the workpiece/the batch can be established and performed in a second work step VI.

In a third work step VII, according to FIG. 2*b*), a manual readjustment and storage of the generated heat treatment formula in the program databank can be performed.

In a fifth program step VII (FIG. 1), a transmission of the heat treatment formula to the industrial furnace 5 is performed, for the heat treatment of the workpiece/the batch running autonomously therein, the heat treatment program from the program databank 12 being retrieved and mediated for the heat treatment.

In the first program step I, the treatment method is determined from data of the material group and the material according to a first file, second file, and third file of the material databank 10.

In the second program step II, the virtual wall thickness is generated according to an algorithm as a function=$f_V$* according to the equation $f_V = f_{CG} * f_{CA} * f_{G1}$.

The rulebook 11 comprises a fourth file for the comparative geometry, a fifth file for the batch layout, a sixth file for the heating characteristic, and a seventh file for the quenching characteristic.

The fourth file in the rulebook 11 contains the data for the detail of comparative geometries, such as sphere, cylindrical disk, hollow-cylindrical ring, cylindrical shaft, square plate, square rod, square cube.

The fifth file in the rulebook 11 contains the batch layout as single-layer recumbent, single-layer upright, multilayer recumbent, multilayer upright, stacked.

In the third program step III, the heating characteristic is input according to the sixth file in the rulebook 11 in the dimension of the number of the preheating steps in slopes of ° C./min as the gradient and the quenching characteristic is input according to the seventh file 2.9 in bar.

After the first program step I, a stored TTT diagram 20.2 (FIG. 3*a*)) and a stored tempering diagram 20.1 (FIG. 3*b*)) are displayed on a user interface 30 in the computer 1 (FIG. 1) as diagrams 20.

The desired work hardness is input according to an eighth file from the material databank 10.

The complex heat-technology formula running in the industrial furnace 5 and generated and stored from parameters of a heat treatment of a specified technology is measured according to FIG. 1 using the measuring unit 7 at actual values, compared via the comparison circuit 8 to the parameters of the specified technology, and readjusted using the regulating unit 6 in the event of inequality.

The user interface 30 according to FIG. 3a) and FIG. 3b), having five virtual slide controls, such as a first virtual slide control II.2.1, a second virtual slide control II.4.1, a third virtual slide control II.5.1, a fourth virtual slide control III.1, and a fifth virtual slide control III.2.1, is used for the programmed preparation of the heat-technology formula. These support a user-friendly and objective selection and/or display of the values acquired within limits of the input data stored in the corresponding files.

This user interface 30 is both an expedient technological aid and also an aid in formal logic, which thus guides the operator during a program control for determining the technological formula of an objectively required heat treatment.

As schematically shown in FIG. 2a) and FIG. 2b), the heat treatment of the workpiece is established using the step-by-step generation or specification of the parameters 2 which can be precalculated according to the following method steps, after which the computer 1 (FIG. 1) generates the final heat treatment program for the industrial furnace 5 (FIG. 1).

The invention makes itself more precise in the program steps according to selected data as follows, for example:

In the first program step I, a treatment method such as hardening plus 3× tempering here is determined from data of the material group, such as high-speed steel, and the exemplary material, such as HS6 5 2C, as a function of this selected material.

In the second program step II,
- a wall thickness of 10 mm is input,
- a comparative geometry is input as square plate using the first virtual slide control II.2.1,
- a total batch weight of 100 kg is input, and
- a batch layout is input as stacked using the second virtual slide control II.4.1 using data of workpieces of a batch, and a virtual wall thickness of 13 mm is generated automatically therefrom, which is still changeable using the third virtual slide control II.5.1 and can be displayed according to FIG. 3a) and FIG. 3b) in a field II.5.

This generated wall thickness of 13 mm is calculated from the function $f_V = f_{CG} * f_{CA} * f_{G1}$, stored according to the invention in the program, using the factors $f_{CG}$, $f_{CA}$, and $f_{G1}$ and the tables integrated in the program, such as

| geometry | geometry factor $f_{G1}$ | geometry summand $f_{G2}$ |
|---|---|---|
| sphere | 0.9 | 0.0 |
| cylindrical disk | 1.0 | 0.0 |
| hollow-cylindrical ring | 1.05 | 0.0 |
| cylindrical shaft | 1.0 | 0.0 |
| hollow-cylindrical tube | 1.1 | 0.1 |
| square plate | 1.0 | 0.1 |
| square rod | 1.0 | 0.1 |
| square cube | 1.0 | 0.0 |

| batch layout | batch layout factor $f_{CA}$ |
|---|---|
| single-layer recumbent | 1.0 |
| single-layer upright | 1.0 + $f_{G2}$ |
| multilayer recumbent | 1.2 |
| multilayer upright | 1.2 + $f_{G2}$ |
| stacked | 1.3 |

| batch weight | batch weight factor $f_{CG}$ |
|---|---|
| weight <= ¼ *maximum weight | 1.0 |
| ¼ * maximum weight < weight <= ²⁄₄ * maximum weight | 1.1 |
| ²⁄₄ * maximum weight < weight <= ³⁄₄ * maximum weight | 1.2 |
| ³⁄₄ * maximum weight < weight | 1.3 |

In the third program step III, a heating characteristic of 2 VW/15° C. and a quenching characteristic of 2 bar, as a function of the material, are integrated from the virtual wall thickness together with the data of the batch and the available parameters of the industrial furnace 5, which (as is obvious from FIGS. 3a) and b)) are selected and changeable using fourth virtual slide control III.1.1 and fifth virtual slide control III.2.1.

Steps of the heating characteristic as a function of the virtual wall thickness, the material, and the selected method (using the sixth file included in the rulebook 11 (FIG. 1)) are:

| slider step | ramp 1 °C./min | preheating step 1 350-400° C. | ramp 2 °C./min | preheating step 2 600-650° C. | ramp 3 °C./min | preheating step 3 750-850° C. |
|---|---|---|---|---|---|---|
| 1 | 2 | yes | 2 | yes | 2 | yes |
| 2 |   | no | 2 | yes | 2 | yes |
| 3 |   | no | 5 | yes | 5 | yes |
| 4 |   | no |   | no | 10 | yes |
| 5 |   | no |   | no | 15 | yes |
| 6 |   | no |   | no | 20 | yes |
| 7 |   | no |   | no | step | yes |
| 8 |   | no |   | no | step | yes |
| 9 |   | no |   | no |   | no |
| 10 |   | no |   | no |   | no |

| slider step | ramp 4 °C./min | preheating step 4 1050-1100 °C. | ramp 5 °C./min | processing temperature 650-1250 °C. |
|---|---|---|---|---|
| 1 | 2 | yes | 2 |   |
| 2 | 2 | yes | 2 |   |
| 3 | 5 | yes | 5 |   |
| 4 | 10 | yes | 10 |   |
| 5 | 15 | yes | 15 |   |
| 6 | 20 | yes | 20 |   |
| 7 | 20 | yes | 20 |   |
| 8 | step | yes | 20 |   |
| 9 | step | yes | 30 |   |
| 10 |   | no | step |   |

The proposed step of the heating characteristic as a function of the virtual wall thickness is ascertained according to the following table:

| wall thickness | slider step |
|---|---|
| 0-10 mm | 6 |
| 10-50 mm | 5 |
| 50-150 mm | 3 |
| 150-600 mm | 2 |

The number of the preheating steps is a function of both the selected method and also the material used.

The data for this purpose are stored in the material databank 10 and in the rulebook 11 (FIG. 1).

The range of the possible slider steps for the heating characteristic is a function of the number of the preheating steps according to the following table.

| number of preheating steps | possible slider steps |
|---|---|
| 1 | 9-10 |
| 2 | 4-10 |
| 3 | 2-10 |
| 4 | 1-10 |

The quenching characteristic, which is a function of the virtual wall thickness, the material, and the selected method, is ascertained as follows.

For each material, a table is also stored in the material treatment databank, which specifies the crunch pressure as a function of the virtual wall thickness. The virtual wall thicknesses are each grouped into four ranges.

EXAMPLE

HS6-5-2C

| wall thickness | quench pressure in bar |
|---|---|
| 0-10 mm | 2 |
| 10-50 mm | 5 |
| 50-150 mm | 8 |
| 150-600 mm | 12 |

In the first work step IV, a desired work hardness is selected and input as a directional value from a value range according to the tempering diagram 20.1 (FIG. 3*b*)), which is a function of the material, having achievable target value of 66 HRC.

In the second work step VI, the generated heat treatment program can be set to a time-optimized or low-deformation treatment of the workpiece/the batch.

In the fourth program step V, the complex heat-technology formula having the program name VW(850,1080)H(1210) A540,540,510) is automatically generated, which can be repeated and stored in the program databank for a retrieval of an input to the industrial furnace 5 and can be displayed according to FIG. 3*a*) and FIG. 3*b*) under the reference numeral V.1.

In the third work step VII (FIG. 2*b*)), a manual readjustment of the heat-technology formula is possible.

For the heat treatment of the workpiece/the batch running autonomously in the industrial furnace 5, the heat treatment program is retrieved from the program databank in the fifth program step VIII (FIG. 1) and mediated for heat treatment in the industrial furnace 5.

With reference to FIG. 3*a*) and FIG. 3*b*), for the sequence of the program In the material databank 10 (FIG. 1)
  a) the first file comprises the specifications of the material groups, such as the high-speed steel selected here in a field I.1,
  b) the second file comprises the definition of the materials, such as HS-6-5C selected here in a field I.2,
  c) the third file comprises the treatment method, as determined here in a field I.3 by hardening+3× tempering, and
  d) the eighth file comprises the desired work hardness of 66 HRC, input here in a field IV.1,
    in the rulebook 11 (FIG. 1)
  e) the fourth file comprises the detail of comparative geometries, as detailed here in a field II.2 by square plate,
  f) the fifth file comprises the batch layout which can be input using second virtual slide control II.4.1, as indicated here by stacked in a field II.4,
  g) the sixth file, which is responsible for the heating characteristic, from which the dimension having two preheating stages in the slope of 15° C./minutes is detailed in a field III.1
  h) the seventh file, which is responsible for the quenching characteristic, from which 2 bar is input in a field III.2.

The data for wall thickness are input as 10 mm in a field II.1 and the data for the batch weight are input as 100 kg in a field II.3, without files stored in the computer.

The optimization settings are performed in a field V.1 (FIG. 3*a*) and FIG. 3*b*)) as time-optimized or in a field V.2 as low-deformation Finally, the name of the heat-technology formula appears in the field VI.1 (FIG. 3*a*) and FIG. 3*b*)), as generated here by "VW(850,1080)H(1210)A540,540,510)".

The complex heat-technology formula having the program name VW(850,1080)H(1210)A540,540,510), which runs in the industrial furnace 5 and is generated and stored from parameters of the heat treatment of a specified technology, is measured according to FIG. 1 using a measuring unit 7 at actual values, compared via a comparison circuit 8 to the parameters of the specified technology, and readjusted using a regulating unit 6 in the event of inequality.

For this purpose, according to FIG. 1, the apparatus for performing the method comprises the computer 1 having the program databank 12 for a programmed storage of the cited generated heat treatment program and its retrieval for the activation of the heat treatment in the industrial furnace 5, for which purpose the measuring unit 7 for the actual values measured in the industrial furnace 5, the comparison circuit 8 for the comparison to parameters of the specified technology, and the regulating unit 6 for the readjustment in the event of inequality of parameters are provided.

The user interface 30 associated with the computer 1 according to FIG. 3*a*) and FIG. 3*b*) thus displays the above designated fields as follows:
  material group (field I.1), material (field I.2), and method (field I.3),
  wall thickness (field II.1), comparative geometry (field II.2), batch weight (field II.3), batch layout (field II.4), virtual wall thickness (field II.5),
  heating characteristic (field III.1), quenching characteristic (field III.2),
  work hardness/target hardness (field IV.1),
  time-optimized (field VI.1) or low-deformation (field VI.2) setting, and
  program name (field V.1).

At a desired point in time of the heat treatment of the batch to be performed autonomously in the industrial furnace 5 corresponding to this complex generated formula, this generated program "VW(850,1080)H(1210)A540,540,510)" can be retrieved via a button (not shown) of the user interface 30 from the program databank according to the eighth program step VIII (FIG. 1) and mediated in the industrial furnace 5 for the heat treatment.

According to FIG. 3a) and FIG. 3b), the heat treatment program, which is prepared step-by-step, can be symbolically reconstructed in its entirety in the user interface 30 and can be processed manually and without errors using sliders or buttons (not shown in greater detail), for example.

FIGS. 2a) and 2b) give an overview of the relationships of the programmed sequence of the preparation of the heat-technology formula according to the corresponding values up to the programmed storage of the generated heat treatment program and the retrieval from the program databank 12 for the activation of the heat treatment in the industrial furnace 5 as a flowchart. The fundamental program sequence according to the invention is obvious therefrom.

The contexts and relationships shown and explained in the individual blocks of FIG. 2a) and FIG. 2b) are part of the content of the disclosure of the invention and also permit program controls according to the invention which may be similar or equivalent to those described here. It is decisive for this purpose that the program, such as "VW(850,1080)H (1210)A540,540,510)" here, is finally automatically generated from the listed parameter similarly to FIG. 2a) and FIG. 2b) and FIG. 3a) and FIG. 3b).

Industrial Applicability

According to the internal tests and achieved results, it is ensured that the potential operators of industrial furnaces for the heat treatment of metal workpieces may achieve their concepts for autonomous operating processes during the heat treatment of workpiece patches efficiently and extensively independently of special knowledge of the operating personnel using the method and computer program according to the invention for preparing corresponding technological formulas and using the apparatus.

| List of reference numerals | |
|---|---|
| 1 | computer |
| 5 | industrial furnace |
| 6 | regulating unit |
| 7 | measuring unit |
| 8 | comparison circuit |
| 10 | material databank having first file for material group, second file for material, third file for method, and eighth file for work hardness |
| 11 | rulebook having fourth file for comparative geometry, fifth file for batch layout, sixth file for heating characteristic, seventh file for quenching characteristic |
| 12 | program databank |
| 20 | diagram |
| 20.1 | tempering diagram |
| 20.2 | TTT diagram |
| 30 | user interface |
| I | first program step |
| I.1 | material group field |
| I.2 | material field |
| I.3 | method field |
| II | second program step |
| II.1 | wall thickness field |
| II.2 | comparative geometry field |
| II.2.1 | first virtual slide control |
| II.3 | batch weight field |
| II.4 | batch layout field |
| II.4.1 | second virtual slide control |
| II.5 | virtual wall thickness field |
| II.5.1 | third virtual slide control |
| III | third program step |
| III.1 | heating characteristic field |
| III.1.1 | fourth virtual slide control |
| III.2 | quenching characteristic field |
| III.2.1 | fifth virtual slide control |
| IV | first work step |
| IV.1 | work hardness field (target hardness) |
| V | fourth program step |
| V.1 | name of the generated heat-technology formula/program name |
| VI. | second work step |
| VI.1 | time-optimized field |
| VI.2 | low-deformation field |
| VII | third work step |
| VIII | fifth work step |

The invention claimed is:

1. A method for the automatic preparation of technological formulas for the heat treatment of metal workpieces in industrial furnaces using values for a material of a particular workpiece, details of heat treatment methods, and technical details of a particular industrial furnace, a step-by-step specification or generation of parameters, which can be precalculated, for the heat treatment of the workpiece, a computer, which generates a heat treatment program, having databanks and a programmed storage of a generated heat treatment program and the retrieval for activation of the heat treatment in the industrial furnace, comprising the following steps:

a) in a first program step, a material group and the material are selected and a heat treatment method is determined as a function of the selected material, b) in a second program step, data of a workpiece batch including a wall thickness are input, a comparative geometry is selected, a batch weight is input, and a batch layout is selected, and a virtual wall thickness is calculated automatically therefrom, c) in a third program step, heating and quenching characteristics, which are a function of the material and are optionally manually changeable, are derived from the virtual wall thickness together with the data of the batch and the available parameters of the industrial furnace, and d) in a fourth program step firstly
data of the selected material on treatment parameters and data of the selected heat treatment method are loaded into a formula structure template and
are compiled into a formula structure from the formula structure template, employing the data from a user interface, such as
heating characteristic and
quenching characteristic, and, optionally
a target hardness, from which
values of formula segments are established, including segment durations,
temperatures,
ramp slopes and/or temperature ramps, and
pressures and then, in the result of the fourth program step, a technological heat treatment formula is automatically generated, which can be readjusted, stored in a program databank, and retrieved for the heat treatment of metal workpieces at the industrial furnace.

2. The method according to claim 1, wherein, after the third program step, in a first work step, a target hardness is selected and input as a directional value of a work hardness from a value range according to achievable work hardnesses which are a function of the material.

3. The method according to claim 1 wherein, after at least the third program step, in a second work step, an optimization setting for a time-optimized or low-deformation treatment of the workpiece/the batch is established and set.

4. The method according to claim 1 wherein, in a third work step, manual readjustment and storage of the generated heat treatment formula in the program databank are performed.

5. The method according to claim 1 wherein, in a fifth program step, a transmission of the heat treatment formula to the furnace is performed, the heat treatment program being retrieved from the program databank and mediated for the heat treatment in the industrial furnace for the autonomously running heat treatment of the workpiece/the batch in the industrial furnace.

6. The method according to one claim 1 wherein, in the first program step, the treatment method is determined from data of the material group and the material according to a first file, second file, and third file of a material databank.

7. The method according to claim 1 wherein, in the second program step, the virtual wall thickness is generated according to an algorithm as the function=$f_v$ *according to the equation $f_v = f_{CG} * f_{CA} * f_{G1}$, wherein $f_{CG}$ is a batch weight factor, $f_{CA}$ is a batch layout factor, and $f_{G1}$ is a geometry factor.

8. The method according to claim 1 wherein, a rulebook is used, which comprises a fourth file for the comparative geometry, a fifth file for the batch layout, a sixth file for the heating characteristic, and a seventh file for the quenching characteristic.

9. The method according to claim 8 wherein, the fourth file in the rulebook comprises the data for the detail of comparative geometries, including sphere, cylindrical disk, hollow-cylindrical ring, cylindrical shaft, square plate, square rod, square cube.

10. The method according to claim 8 wherein, the fifth file in the rulebook comprises the batch layout including single-layer recumbent, single-layer upright, multilayer recumbent, multilayer upright, stacked.

11. The method according to claim 8 wherein, in the third program step, the heating characteristic is input according to the sixth file in the rulebook in the dimension of the number of the preheating steps in slopes of ° C./min as the gradient and the quenching characteristic is input according to the seventh file in bar.

12. The method according to claim 1 wherein, after the first program step, a TTT diagram stored in the computer and a stored tempering diagram are displayed.

13. The method according to claim 2 wherein, the target work hardness is input according to an eighth file from the material databank.

14. The method according to claim 1 wherein a complex heat-technology formula, which runs in the industrial furnace, is generated from parameters of a heat treatment of a specified technology, and is stored, is measured using a measuring unit at actual values, compared to the parameters of the specified technology via a comparison circuit, and readjusted using a regulating unit in the event of inequality.

15. An apparatus for performing the automatic preparation of technological formulas for the heat treatment of metal workpieces in an industrial furnace, comprising a computer system programmed to perform the method of claim 1 for the automatic preparation of technological formulas for the heat treatment of metal workpieces in industrial furnaces for activation of the heat treatment in an industrial furnace, said computer system comprising databanks and a user interface associated with the computer which has fields for the display of material group, material, and method, wall thickness, comparative geometry, batch weight, batch layout, virtual wall thickness, heating characteristic, quenching characteristic, work hardness/target hardness, time-optimized, low-distortion, and program name.

16. The apparatus according to claim 15, wherein the user interface has a first virtual slide control for the comparative geometry, which can be selected and changed by the operator.

17. The apparatus according to claim 16 wherein the user interface has a second virtual slide control for the batch layout, which can be selected and changed by the operator.

18. The apparatus according to claim 17 wherein the user interface has a third virtual slide control for the virtual wall thickness, which can be selected and changed by the operator.

19. The apparatus according to claim 18 wherein the user interface has a fourth virtual slide control for the heating characteristic, which can be selected and changed by the operator.

20. The apparatus according to claim 19 wherein the user interface has a fifth virtual slide control for the quenching characteristic, which can be selected and changed by the operator.

21. The apparatus according to any of claims 15 to 20, comprising a measuring unit for actual values measured in the industrial furnace, a comparison circuit for the comparison to parameters of the technology specified according to the generated heat treatment program, and a regulating unit for a readjustment in the event of inequality of parameters.

* * * * *

UNITED STATES PATENT AND TRADEMARK OFFICE
CERTIFICATE OF CORRECTION

| | | |
|---|---|---|
| PATENT NO. | : 8,175,744 B2 | Page 1 of 1 |
| APPLICATION NO. | : 12/682512 | |
| DATED | : May 8, 2012 | |
| INVENTOR(S) | : Frank Biester et al. | |

It is certified that error appears in the above-identified patent and that said Letters Patent is hereby corrected as shown below:

On the title page item (54) and column 1, line 1, change the title to read -- Method and Computer Program for Automatic Preparation of Technological Recipes for the Heat Treatment of Metal Workpieces in Industrial Furnaces and Device for Performing the Method and Computer Program --.

Column 17, line 44 (Claim 9, line 3), after "including" and before "sphere", insert -- a --.

Signed and Sealed this
Fourteenth Day of August, 2012

David J. Kappos
*Director of the United States Patent and Trademark Office*